United States Patent
Peng

(10) Patent No.: US 10,321,394 B2
(45) Date of Patent: Jun. 11, 2019

(54) INFORMATION PROCESSING APPARATUS, INFORMATION PROCESSING METHOD, AND CONTROL PROGRAM FOR ADJUSTING A SWITCHING INTERVAL THAT CHANGES THE ACTIVATION STATE OF BASE BAND UNITS

(71) Applicant: NEC Corporation, Minato-ku, Tokyo (JP)

(72) Inventor: Xiao Peng, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/544,988

(22) PCT Filed: Feb. 4, 2015

(86) PCT No.: PCT/JP2015/053717
§ 371 (c)(1),
(2) Date: Jul. 20, 2017

(87) PCT Pub. No.: WO2016/125315
PCT Pub. Date: Aug. 11, 2016

(65) Prior Publication Data
US 2017/0367039 A1 Dec. 21, 2017

(51) Int. Cl.
| H04W 4/00 | (2018.01) |
| H04W 52/02 | (2009.01) |
| H04W 24/02 | (2009.01) |
| H04M 15/00 | (2006.01) |
| H04W 28/02 | (2009.01) |
| H04W 88/08 | (2009.01) |

(52) U.S. Cl.
CPC ..... *H04W 52/0203* (2013.01); *H04M 15/725* (2013.01); *H04W 24/02* (2013.01); *H04W 28/0221* (2013.01); *H04W 28/0247* (2013.01); *H04W 88/085* (2013.01); *Y02D 70/00* (2018.01)

(58) Field of Classification Search
None
See application file for complete search history.

(56) References Cited

U.S. PATENT DOCUMENTS

| 2007/0177552 A1* | 8/2007 | Wu ..................... H04W 88/08 370/335 |
| 2011/0268440 A1* | 11/2011 | Du ..................... H04Q 11/0005 398/45 |
| 2012/0071196 A1* | 3/2012 | Bergman ............... H03F 3/195 455/522 |

(Continued)

OTHER PUBLICATIONS

S.Namba et al., "BBU-RRH Switching Schemes for Centralized RAN", 2012 7th International ICST Conference on Communications and Networking in China (CHINACOM), 2012, pp. 762-766.

(Continued)

*Primary Examiner* — Farah Faroul

(57) ABSTRACT

An information processing apparatus of this invention directed to a process for adjusting a switching interval which defines an interval between two switching operations that change the activation state of the base band units. The apparatus comprises a traffic history storage unit that stores traffic history data, and a control unit that determines the switching interval based on the traffic history data stored in the traffic history storage.

7 Claims, 14 Drawing Sheets

(56) References Cited

U.S. PATENT DOCUMENTS

| | | | |
|---|---|---|---|
| 2012/0129517 A1* | 5/2012 | Fox | H04L 41/5025 455/425 |
| 2012/0309376 A1* | 12/2012 | Huang | H04M 1/72572 455/418 |
| 2013/0170353 A1 | 7/2013 | Liu | |
| 2013/0170574 A1 | 7/2013 | Fleming et al. | |
| 2014/0031049 A1* | 1/2014 | Sundaresan | H04W 16/02 455/447 |
| 2014/0269322 A1* | 9/2014 | Li | H04W 28/08 370/236 |
| 2014/0301265 A1* | 10/2014 | Liu | H04W 16/04 370/311 |
| 2015/0215044 A1* | 7/2015 | Cvijetic | H04Q 11/0062 398/48 |
| 2016/0088522 A1* | 3/2016 | Lu | H04W 28/20 370/235 |
| 2016/0119932 A1* | 4/2016 | Cui | H04L 41/0816 370/255 |
| 2016/0191186 A1* | 6/2016 | Liu | H04J 11/0056 370/280 |
| 2016/0234773 A1* | 8/2016 | Choi | H04W 52/0206 |
| 2016/0337194 A1* | 11/2016 | Laraqui | H04W 88/085 |

OTHER PUBLICATIONS

S. Namba et al., "BBU-RRH Switching Schemes for Centralized RAN", IEICE technical report, Signal Processing (SIP), vol. 112 No. 423, IE ICE The Institute of Electronics, Information and Communication Engineers, Jan. 2013, p. 73-78.

Z. Dalin and M. Lei, "Traffic and Interference-aware Dynamic BBU-RHU Mapping in C-RAN TDD with Cross-subframe Coordinated Scheduling/Beamforming.", IEEE International Conference on Communications 2013: IEEE ICC'13—Workshop on Optical-Wireless Integrated Technology for Systems and Networks 2013, Jun. 13, 2013, p. 884-889.

International Search Report for PCT Application No. PCT/JP2015/053717, dated Mar. 10, 2015.

\* cited by examiner

[Fig. 1]
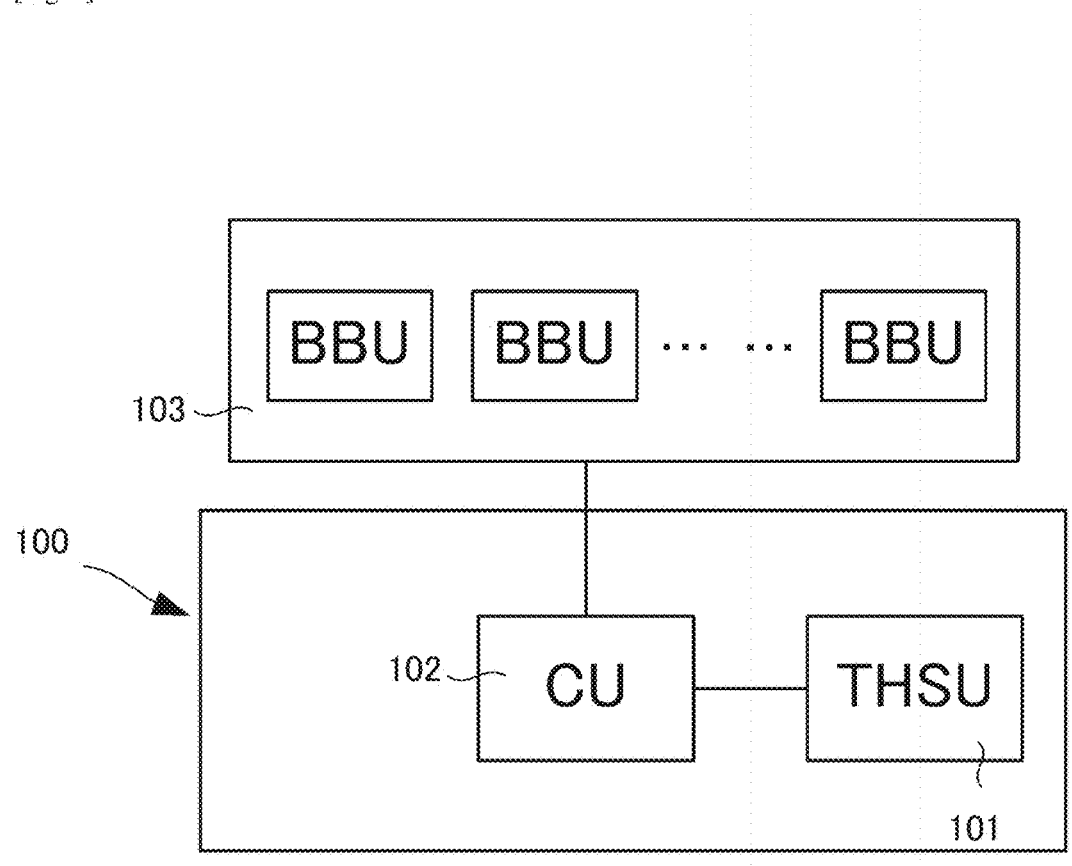

[Fig. 2]
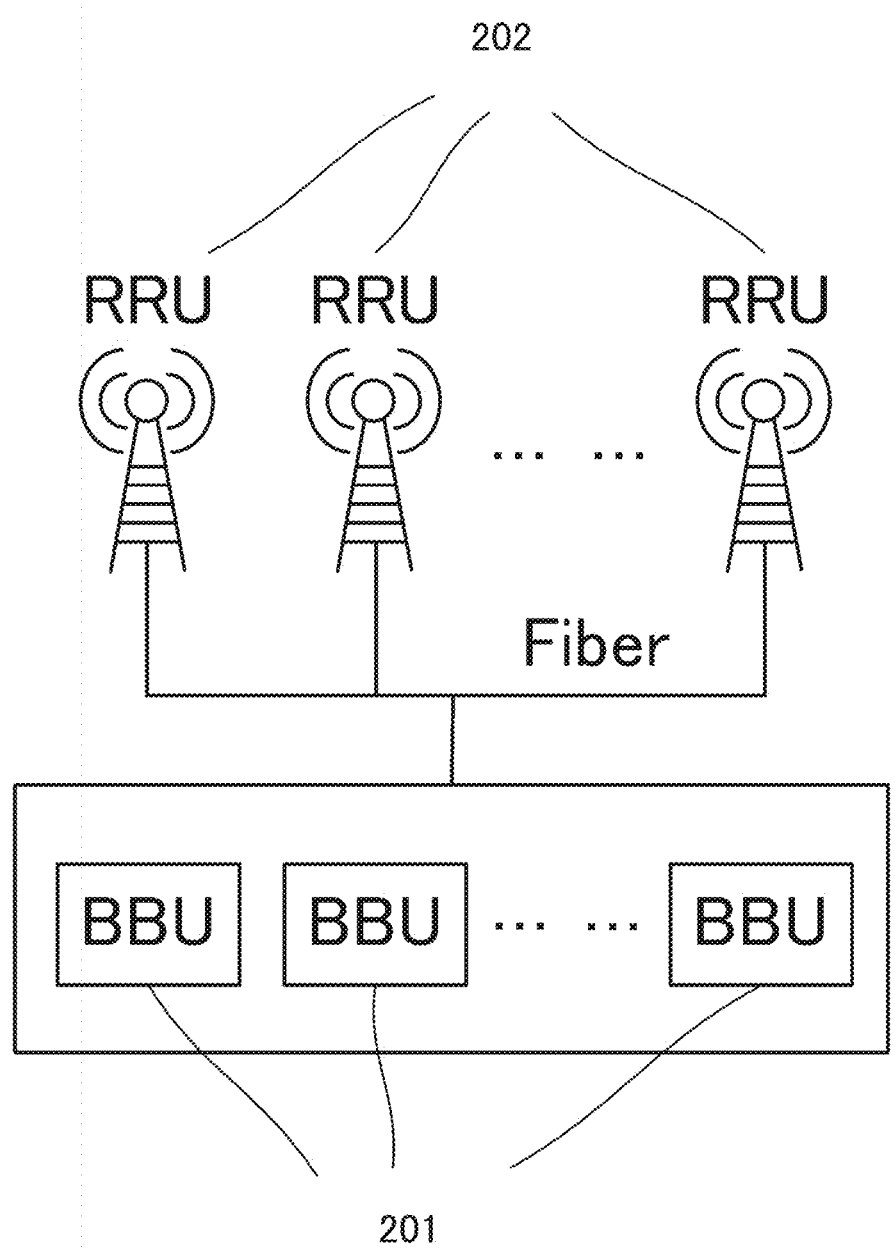

[Fig. 3]
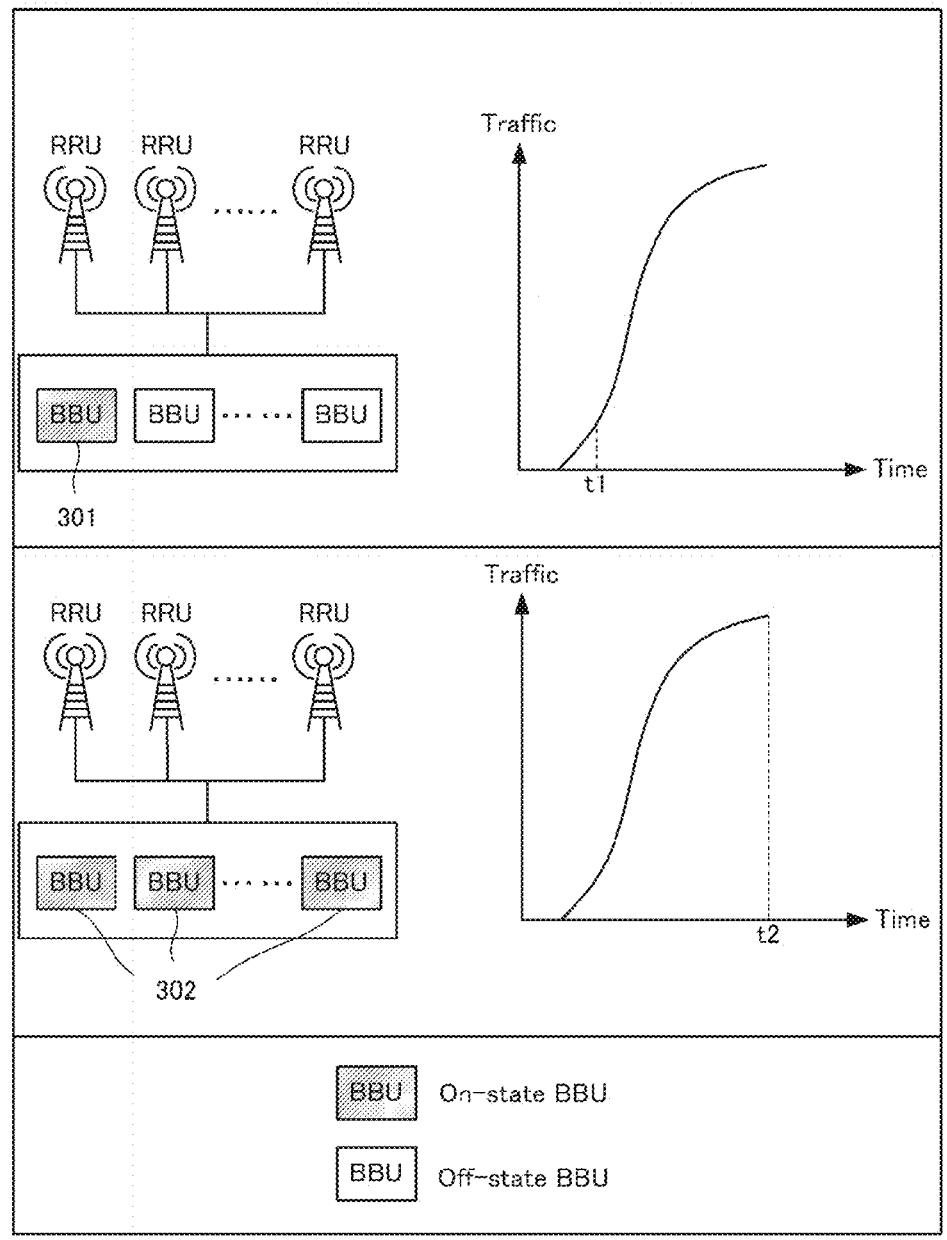

[Fig. 4]
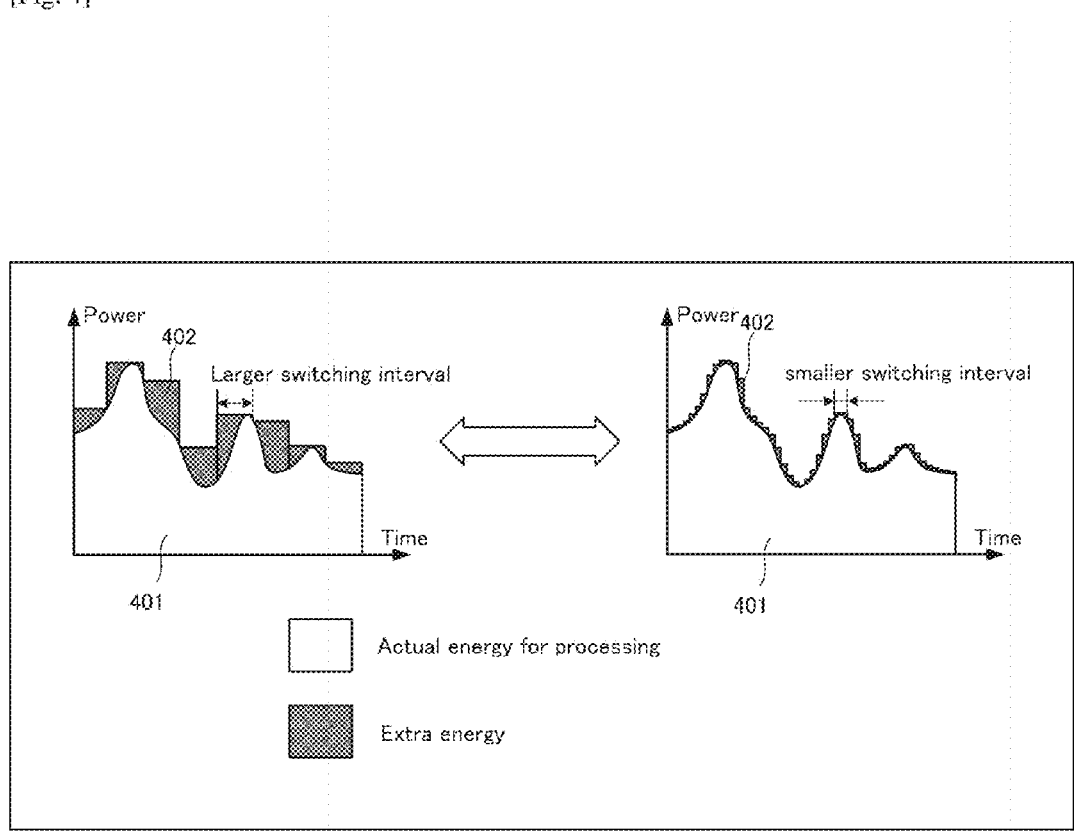

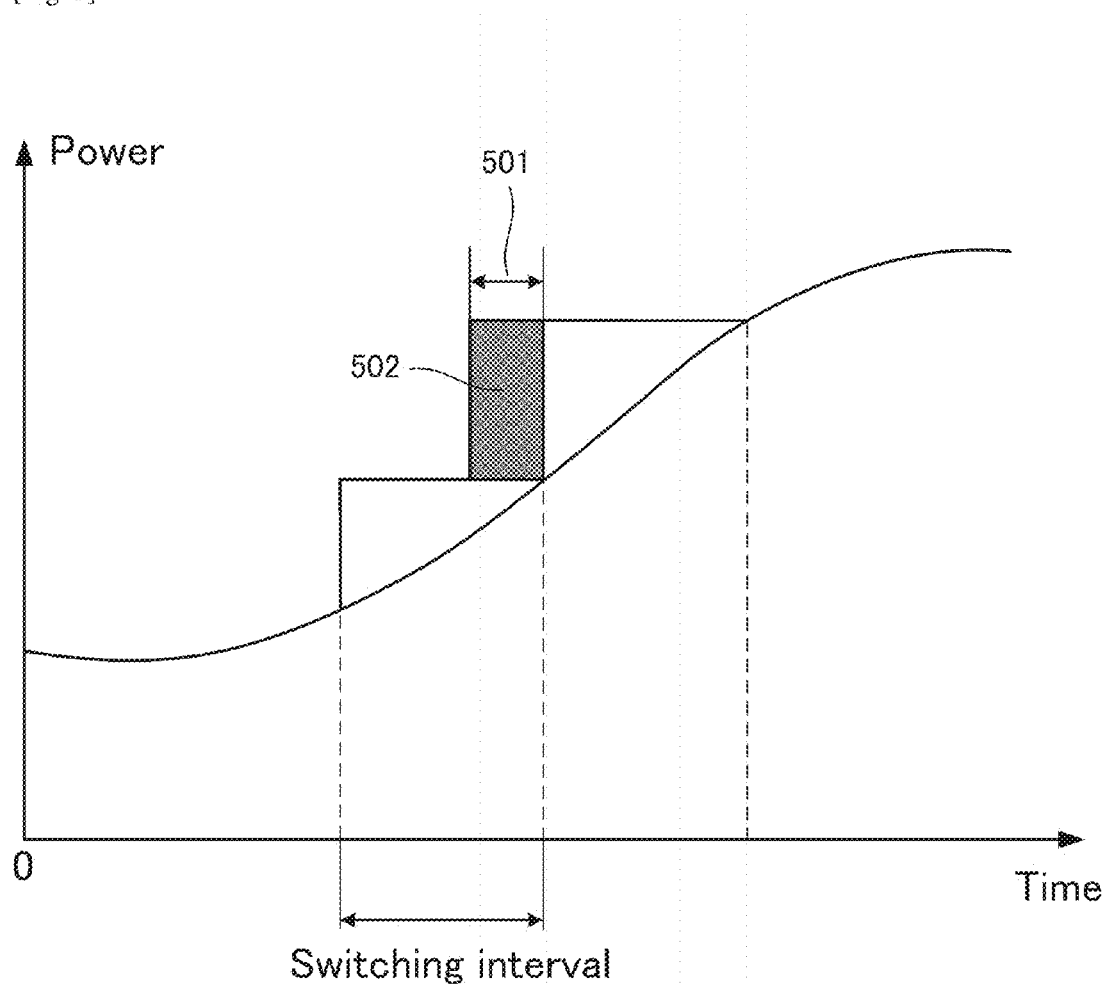
[Fig. 5]

[Fig. 6]
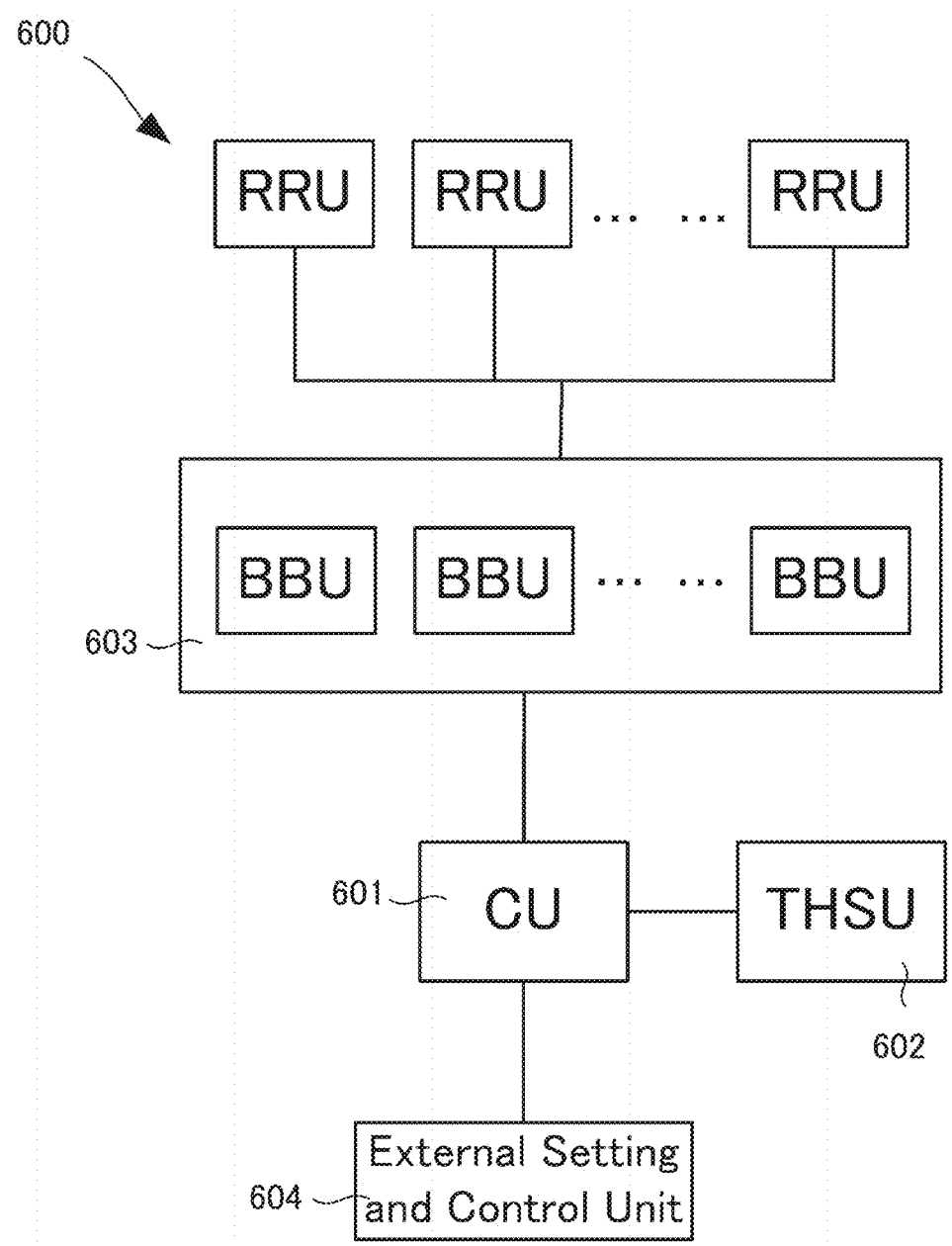

[Fig. 7]
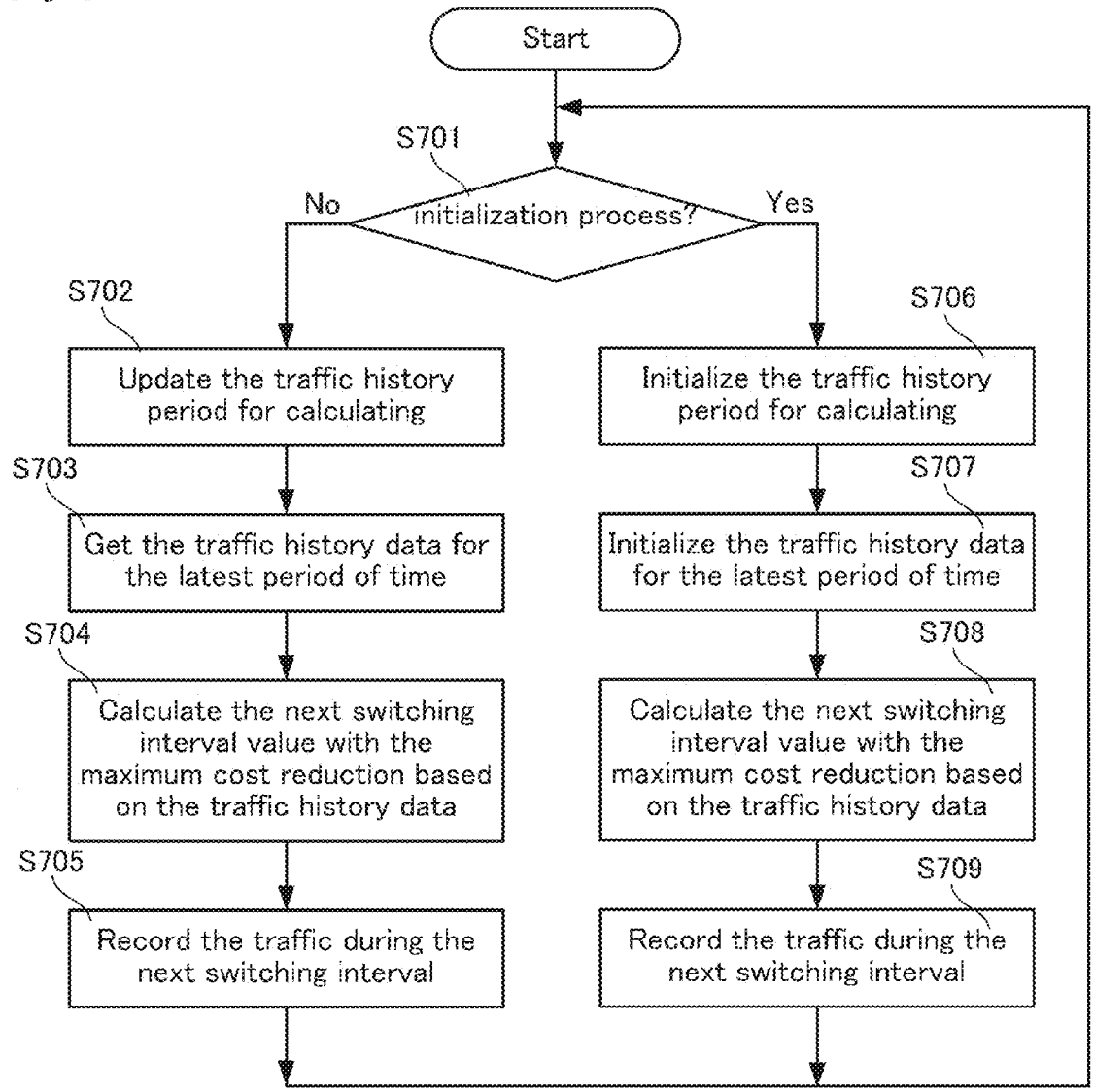

[Fig. 8]
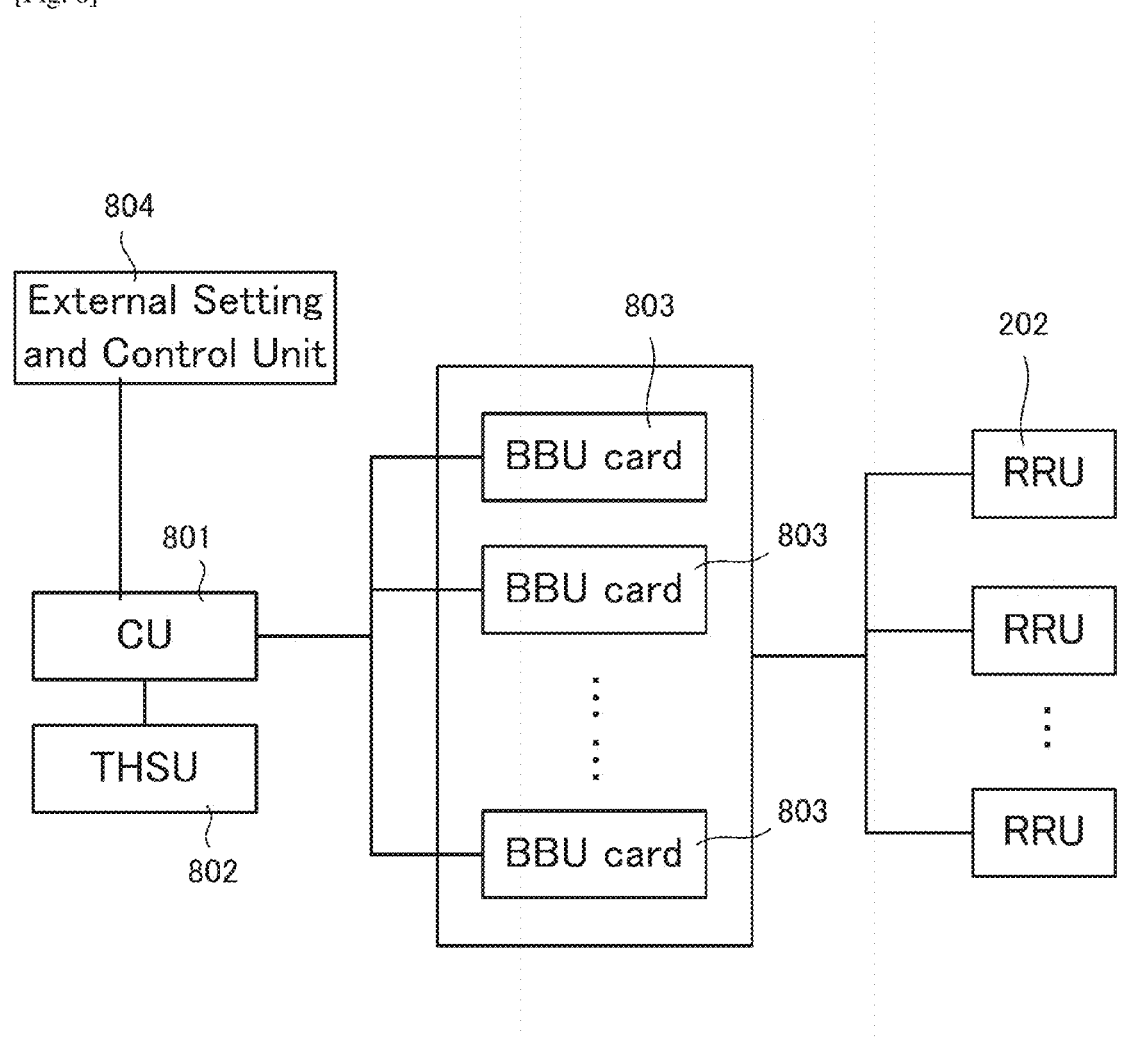

[Fig. 9]
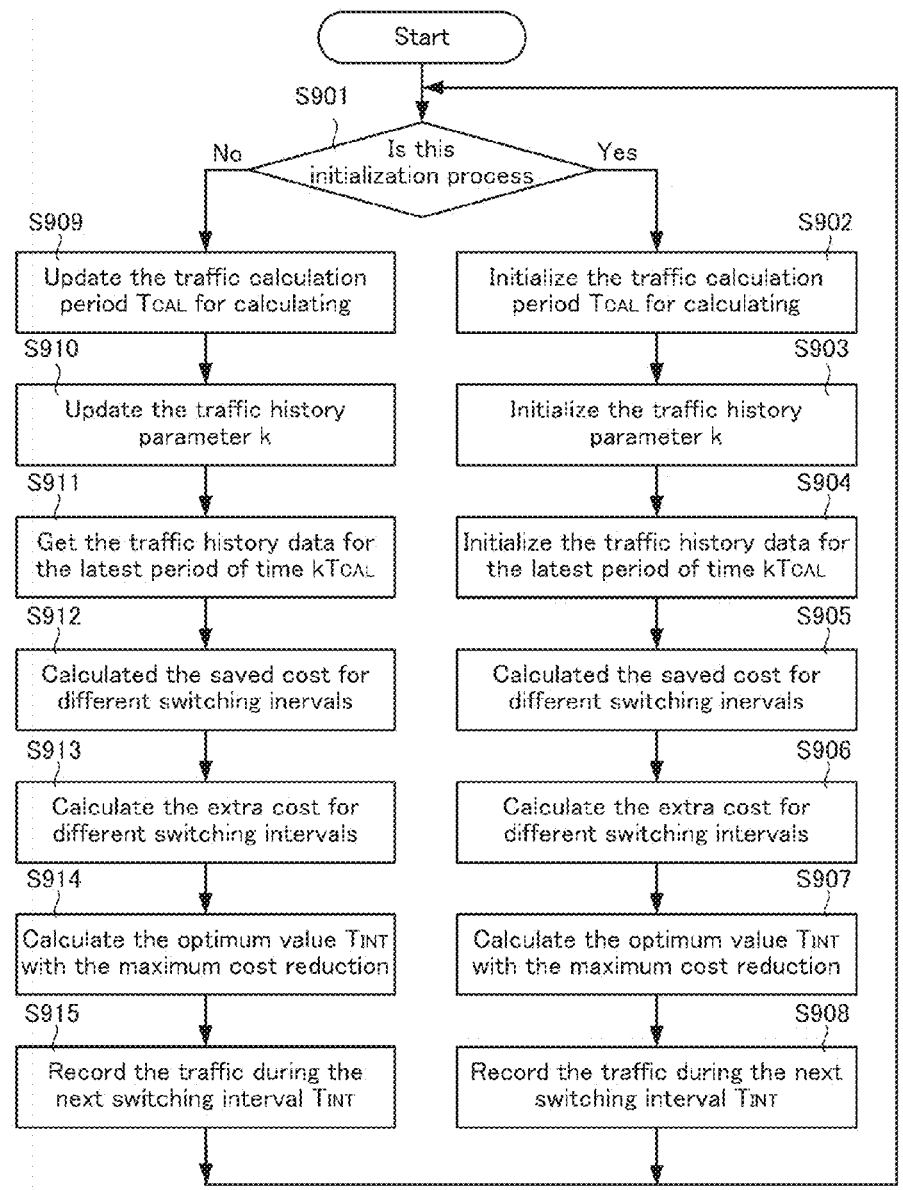

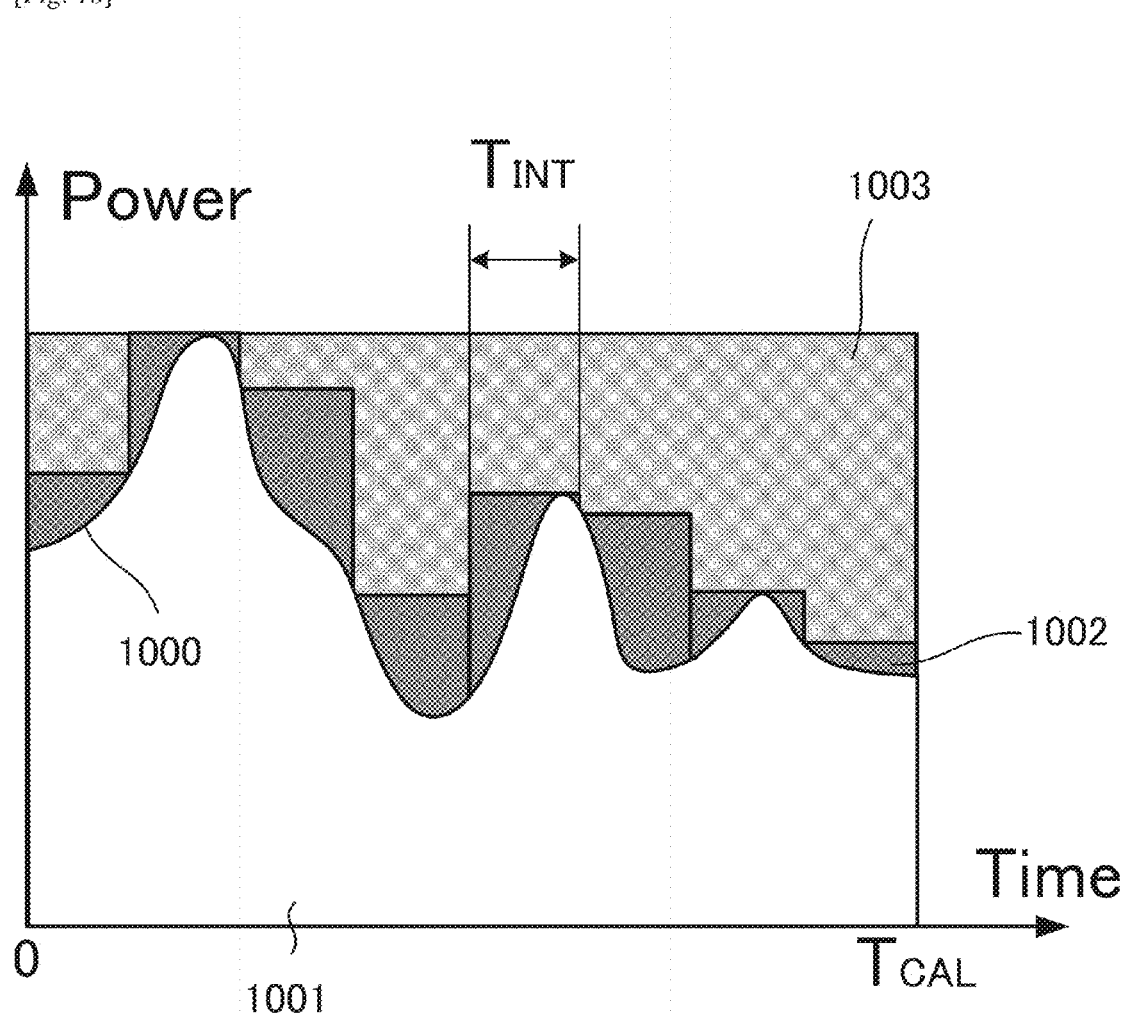
[Fig. 10]

[Fig. 11]
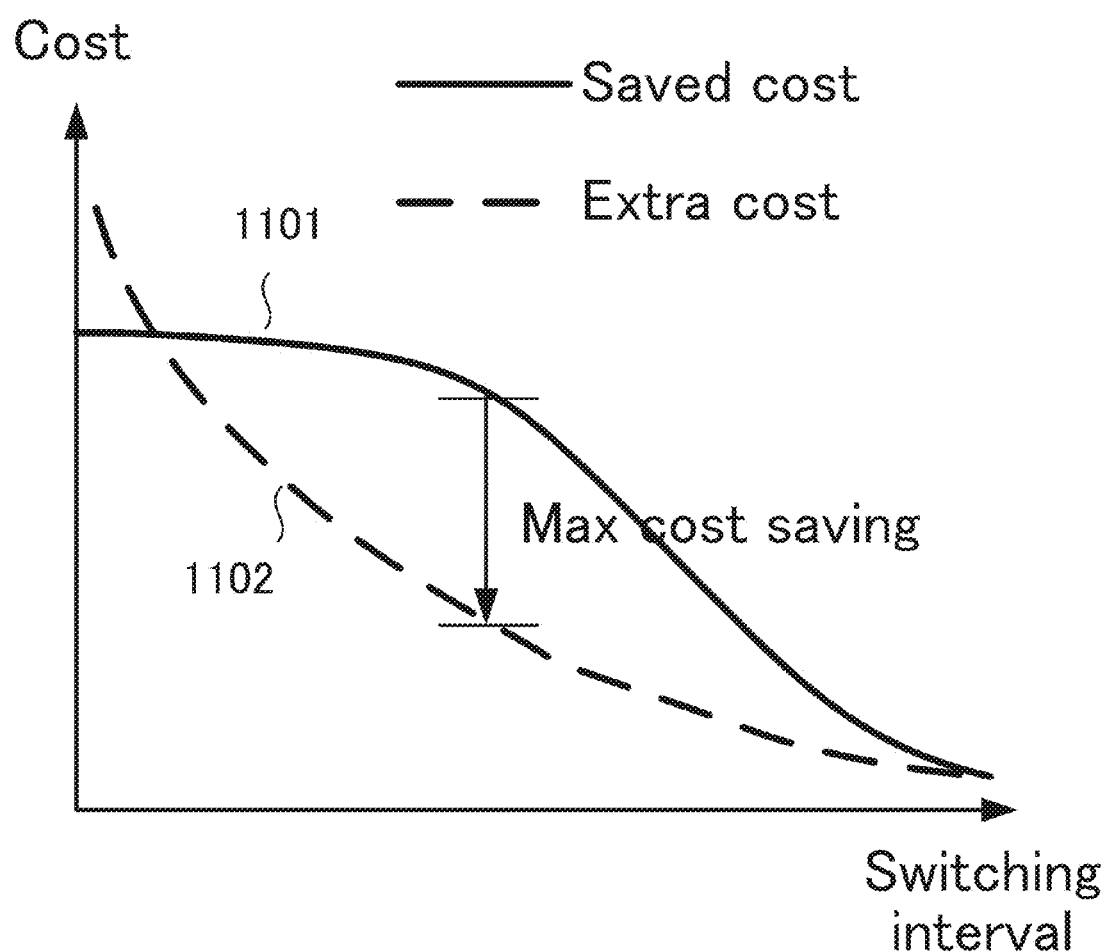

[Fig. 12]
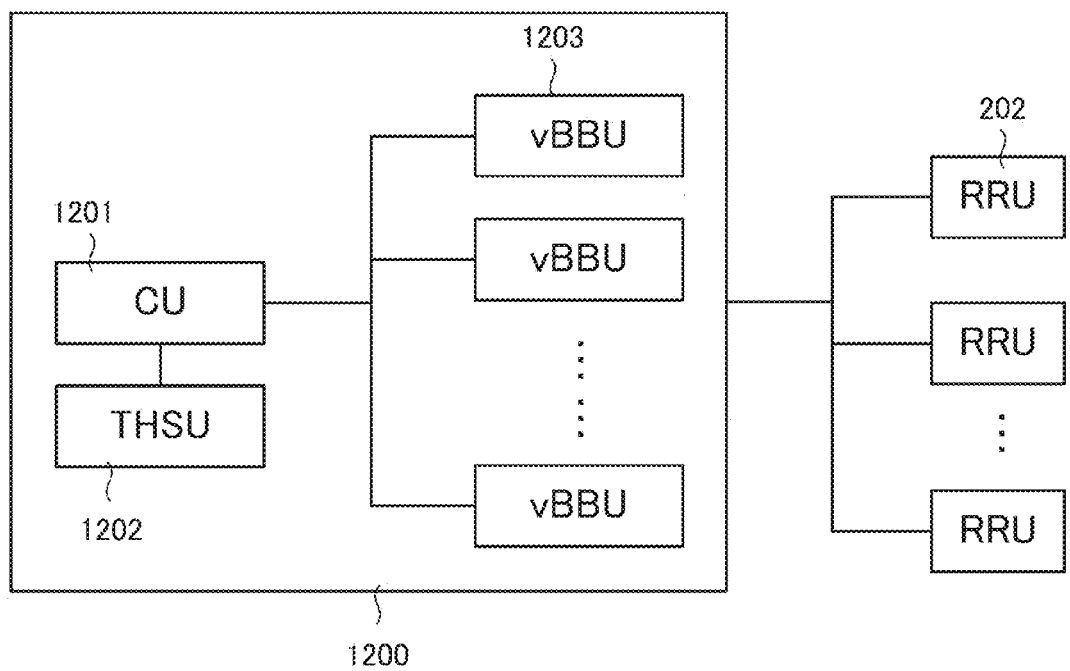

[Fig. 13]
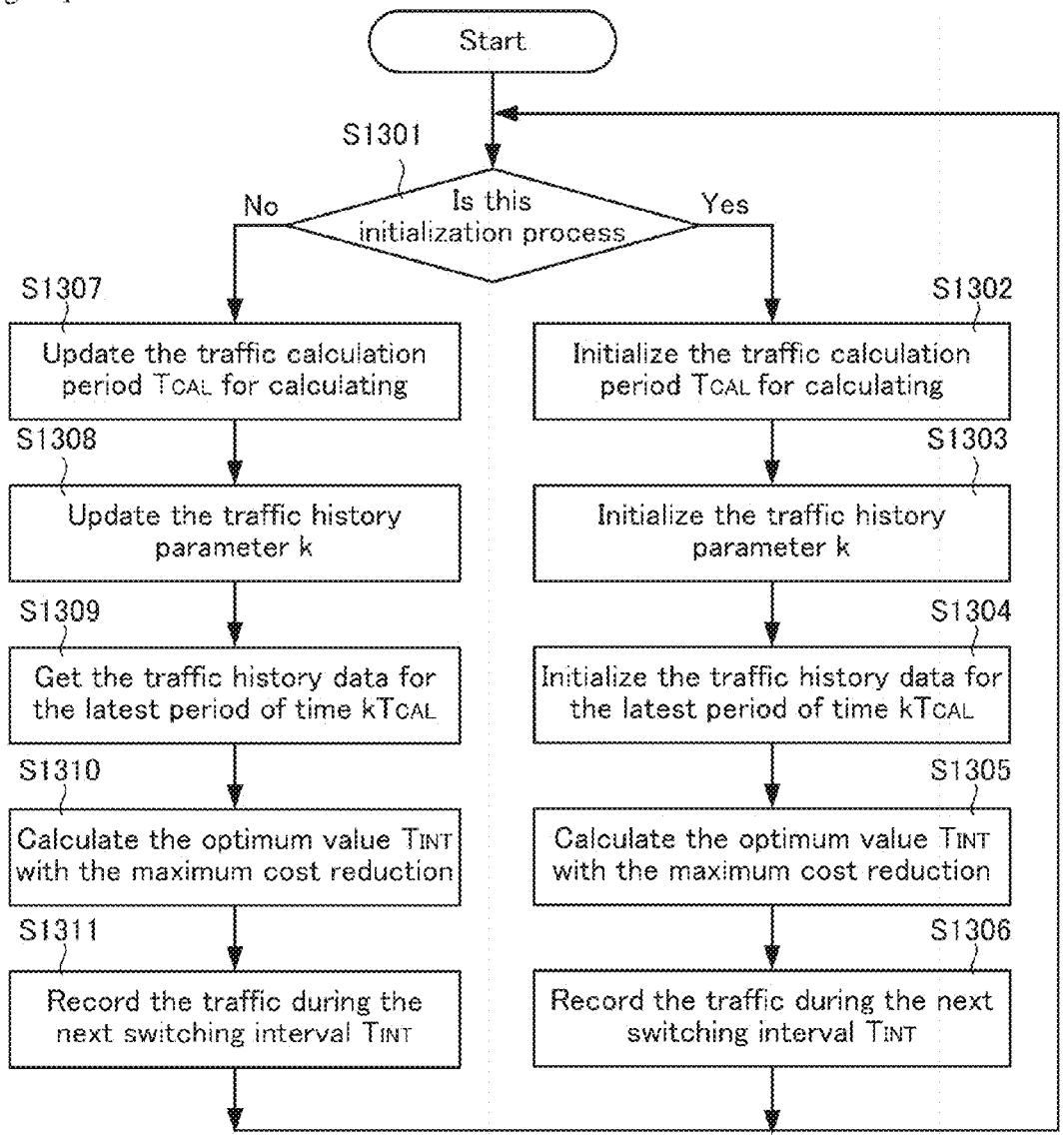

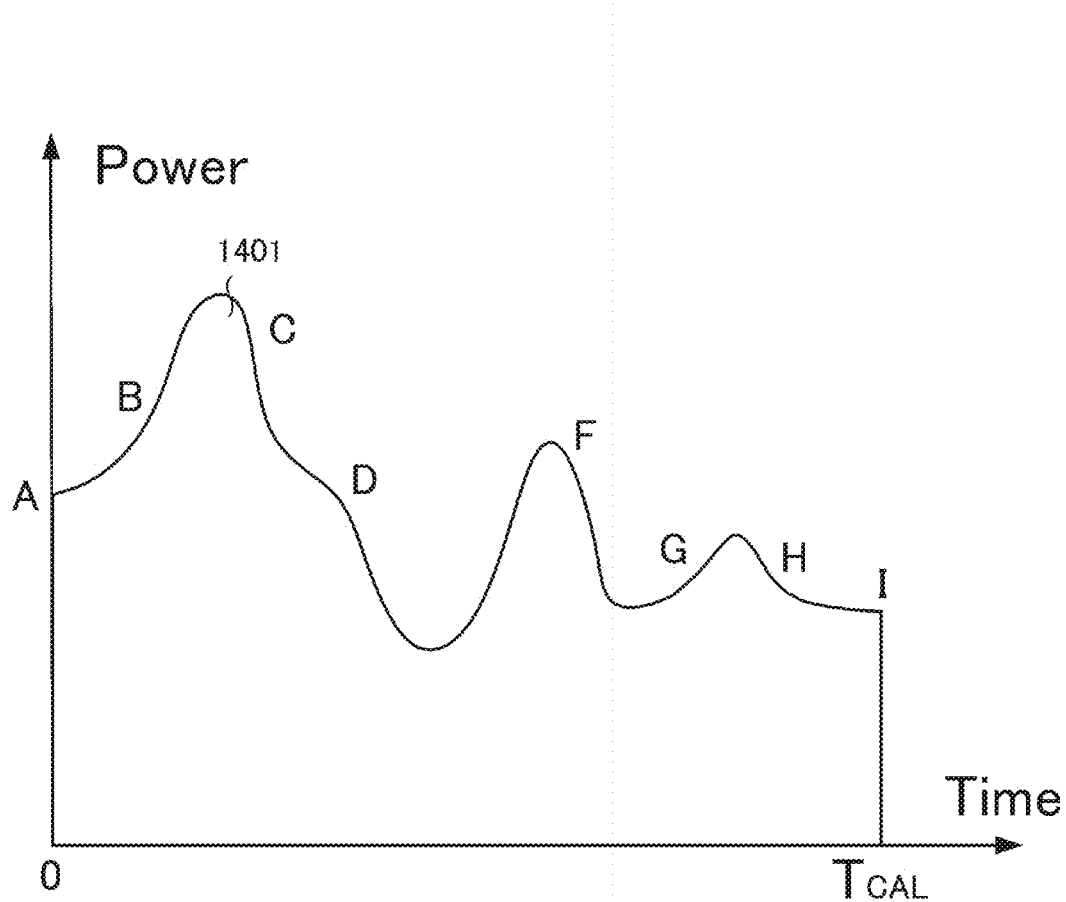
[Fig. 14]

INFORMATION PROCESSING APPARATUS, INFORMATION PROCESSING METHOD, AND CONTROL PROGRAM FOR ADJUSTING A SWITCHING INTERVAL THAT CHANGES THE ACTIVATION STATE OF BASE BAND UNITS

This application is a National Stage Entry of PCT/JP2015/053717 filed on Feb. 4, 2015, the contents of all of which are incorporated herein by reference, in their entirety.

TECHNICAL FIELD

The present invention relates to an information processing apparatus, information processing method and control program

BACKGROUND ART

In the Patent Literature 1, the switching interval is directly set to 24 hours or 1 hour. In the Non Patent Literature 1, the description is that "[0059] For each RRU in the area, any k antennas among all antennas are selected at a preset interval, and k paths of downlink baseband signals are transmitted to k antennas of each RRU, respectively".? Moreover, since the actual traffic varies all the time, if the switching interval is set to a fixed value, the actual cost reduction effect may not be good all the time.

CITATION LIST

Patent Literature

[PTL 1] US patent application No. US20130170353A1

Non Patent Literature

[NPL 1] Paper, 2012 CHINACOM, ?"BBU-RRH Switching Schemes for Centralized RAN"

SUMMARY OF INVENTION

Technical Problem

The present invention enables to provide a technique of solving the above-described problem.

Solution to Problem

One aspect of the present invention provides an information processing apparatus for adjusting a switching interval which defines an interval between two switching operations that change the activation state of the base band units, comprising a traffic history storage unit that stores traffic history data and a control unit that determines the switching interval based on the traffic history data stored in the traffic history storage.

Advantageous Effects of Invention

According to the present invention, the switching interval can be determined and adjusted so as to achieve optimum cost saving effect according to the traffic change.

BRIEF DESCRIPTION OF DRAWINGS

FIG. 1 is a schematic diagram illustrating the architecture of the first embodiment.

FIG. 2 is a schematic diagram illustrating the architecture of the baseband resource pool scheme.

FIG. 3 is a schematic diagram illustrating the example of power saving in baseband resource pool scheme.

FIG. 4 is a schematic diagram illustrating the example that smaller switching interval brings more energy saving.

FIG. 5 is a schematic diagram illustrating the lower limit of the switching interval.

FIG. 6 is a schematic diagram illustrating the architecture of the second embodiment.

FIG. 7 is a schematic diagram illustrating the working process of the second embodiment.

FIG. 8 is a schematic diagram illustrating architecture of the third embodiment.

FIG. 9 is a schematic diagram illustrating the working process of the third embodiment.

FIG. 10 is a schematic diagram illustrating the example of calculating the saved cost from changing the switching interval.

FIG. 11 is a schematic diagram illustrating calculating the optimum switching interval value with the maximum cost saving.

FIG. 12 is a schematic diagram illustrating the architecture of the fourth embodiment.

FIG. 13 is a schematic diagram illustrating the working process of the fourth embodiment.

FIG. 14 is a schematic diagram illustrating the example of calculating the lambda.

DESCRIPTION OF EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

An information processing apparatus 100 according to the first embodiment of the present invention will be described with reference to FIG. 1. The apparatus 100 adjusts a switching interval which defines an interval between two switching operations that change the activation state of the base band units.

The information processing apparatus 100 includes a traffic history storage unit 101, and a control unit 102. The traffic history storage unit 101 stores traffic history data. The control unit 102 determines the switching interval based on the traffic history data stored in the traffic history storage.

The above-described apparatus allows to adjust the switching interval according to the traffic change.

Second Embodiment

The second embodiment of the present invention relates to the architecture and the corresponding method for determining and adjusting the switching interval according the traffic is provided. Base on the traffic history data, the switching interval with the maximum cost reduction is calculated. During the switching interval, the traffic data is recorded. The traffic history period for calculating is updated based on the change of traffic history data. Accordingly, the switching interval can be adjusted according to the traffic change, which achieves better cost reduction effect than the preset switching interval.

Prerequisite Technique

A technique that is a prerequisite of the base station architecture related to the apparatus according to this embodiment will be described first. The base station architecture for Radio Access Network (RAN) in wireless communication system has been changing from the all-in-one macro base station architecture to the distributed base station architecture. In the all-in-one macro base station architecture, the analog, digital and power function devices are integrated in one cabinet which is large and needs dedicated deployment environment. The improvement of the distributed base station is separating the radio function devices and the digital function devices. In this architecture, the radio function devices form the equipment, which is usually called remote radio head (RRH), remote radio unit (RRU) or radio unit (RU). The digital function devices form the equipment, which is usually called baseband unit (BBU) or digital unit (DU). In the generic architecture of the distributed base station architecture. One BBU connects to several RRUs 202 with the fiber using certain standard, such as Common Public Radio Interface (CPRI). The length of the fiber is up to several kilometers, which greatly increases the flexibility of base station deployment.

Based on the distributed architecture, the baseband resource pool (also called baseband resource clustering, baseband resource centralization) scheme is introduced to RAN. FIG. 2 shows the basic diagram of this scheme. Several BBUs 201 are combined together as a pool or cluster. Each BBU 201 is not restricted to certain RRU 202. Namely, each BBU 201 can process the signals from any RRU 202. On the premise that the total number of RRUs is the same as the separated BBUs scheme, the baseband resource pool scheme can change the number of on-state BBUs 201 according to the total traffic variation. As a result, the total energy consumption of the base stations can be reduced and operating expense for mobile network operators can be saved. FIG. 3 shows the example of this energy saving effect. Since the total traffic is low at time t1, only one on-state BBU 301 is enough for processing. The other BBUs are in off-state. At time t2 the traffic is high, all the BBUs 302 are in on-state. The baseband resource pool scheme is also one of the critical technologies of the C-RAN (Cloud-RAN, or Centralized-RAN) architecture.

For the baseband resource pool scheme, the ideal situation is that the on-off state of the BBUs can be changed in accordance with the traffic at any time. Actually, the state switching of BBUs needs some time, which is called the switching interval. The switching interval is the factor which directly influences the energy consumption reduction effect. Generally, smaller switching interval brings more energy consumption reduction. FIG. 4 illustrates the example that smaller switching interval reduces the extra energy cost. In this figure, the curve represents the power variation of all the BBUs according to the traffic in different time. The area 401 in white color represents the energy which is used for processing. The area in gray color 402 represents the extra energy brought from the switching interval.

On the other hand, the switching interval is not the smaller the better. For each switching, there is the lower limit for the state changing time of the hardware and software. The switching interval cannot be smaller than this lower limit. FIG. 5 illustrates the example of the lower limit 501 for the switching interval. Moreover, during the time of the state changing, since the related BBUs cannot provide normal processing, there is extra energy consumption, which is represented by the gray area 502 in FIG. 5. As the switching interval becomes small, the extra energy consumption from this reason increases. Furthermore, as the switching interval becomes small, the frequent switching reduces the reliability of the devices, which increases the depreciation cost of the devices.

Thus, the switching interval should be set as a proper value to achieve the maximum cost reduction effect.

Explanation of Functional Arrangement

FIG. 6 illustrates the block diagram of the Distributed Base Station Architecture 600 according to the second embodiment. For determining the switching interval, the control unit (CU) 601 and traffic history storing unit (THSU) 602 are added to the general baseband resource pool architecture. The THSU 602 stores traffic history data of a certain period of time.

The traffic history data records the measured throughput of the system and if necessary, other corresponding data, such as user number. It can be realized as many forms. For example, there is a timetable list stored in THSU 602 with each row representing each second for a certain period of time, in which the throughput and other data are listed according to the moment when the data are measured.

CU 601 receives the traffic information from BBUs 603 and gives the THSU 602 the traffic information to be recorded. CU 601 also connects to the external setting and control unit 604. According to the traffic history information and the information from external setting and control unit 604, CU 601 determines the switching interval of the BBUs.

FIG. 7 illustrates the working process of the embodiment. At first, it is judged whether or not an initialization process is on. If Yes, at Step S706, the external setting and control unit 604 initializes the traffic history period for calculating. The traffic history data during the period of time is also initialized at Step S707. Base on the traffic history data, the next switching interval value with the maximum cost reduction is calculated (S708). After the following switching operation, during the switching interval time, the traffic is recorded for next switching interval determination (S709). For the process with no initialization, the traffic history period for calculating is updated based on the change of traffic history data (S702). The traffic history data during the updated period of time is fetched from THSU 602 (S703). Base on the traffic history data, the next switching interval value with the maximum cost reduction is calculated (S704). After the following switching operation, during the switching interval time, the traffic is recorded for next switching interval determination (S705). The process is the loop process which guarantees the switching interval can be updated according to the traffic change.

Third Embodiment

The architecture of the third embodiment is illustrated in FIG. 8. In this embodiment, the BBUs are implemented as the real baseband processing cards which are clustered together, for example, the BBU cards 803 are assembled in the same cabinet. The CU 801 is implemented in other computing devices with the memory devices for THSU 802.

For BBU state switching, the CU 801 controls the power supply of all the BBU cards 803. According to the traffic, only the necessary amount of BBU cards 803 are in on-state.

The working process in this embodiment is illustrated in FIG. 9. At first, at Step S901, it is judged whether it is an initialization process. For an initialization process, at Step S902, the external setting and control unit 804 initialize the period of time $T_{CAL}$ during which the cost calculation is carried out. The traffic history parameter k is initialized at Step S903. The traffic history parameter k is used to indicate how long the traffic history data is fetched. The traffic history data during the period of time $kT_{CAL}$ is also initialized. Based on the traffic history data during the period of time $kT_{CAL}$, the saved cost for different switching intervals is calculated (S905). At the same time, the extra cost for different switching intervals is also calculated (S906). Through comparing the saved cost and the extra cost results, the optimum value $T_{INT}$ with the maximum cost reduction is selected for switching interval (S907). After the following switching operation, during the interval time $T_{INT}$, the traffic is recorded for next switching interval determination (S908). For the process with no initialization, the period of time $T_{CAL}$ during which the cost calculation is carried out is updated based on the traffic history update (S909). The traffic history parameter k is updated based on the difference of the traffic data recorded during the last switching interval and the traffic history data in the same period of time (S910). The purpose of this step is to detect the traffic change and to adjust the parameter k. The traffic change is detected as the difference of two items. The first item is the traffic data recorded during the last switching interval $T_{INT}$. The second item is the traffic data recorded during the same period of time but in the previous history. For example, we assume that the last $T_{INT}$ is 1 hour, and the current time is 10:00. Then the first item is the traffic data recorded between 9:00 to 10:00 of today. The second item is the traffic data recorded between 9:00 to 10:00 of yesterday or other days in the past.

The traffic history data during the updated period of time $kT_{CAL}$ is fetched from THSU 802 (S911). Based on the traffic history data during the period of time $kT_{CAL}$, the saved cost for different switching intervals is calculated (S912). At the same time, the extra cost for different switching intervals is also calculated (S913). Through comparing the saved cost and the extra cost results, the optimum value $T_{INT}$ with the maximum cost reduction is selected for switching interval (S914). After the following switching operation, during the interval time $T_{INT}$, the traffic is recorded for next switching interval determination (S915).

The example of calculating the saved cost is illustrating in FIG. 10. The curve 1000 is the power change of total BBUs according to the traffic change during the given time period $T_{CAL}$. The area 1001 in white color represents the energy which is actually used for the processing. In this example, assuming that the switching interval is setting to $T_{INT}$, the area 1002 in gray color represents the extra energy brought from the switching interval $T_{INT}$. Obviously if the interval is set to $T_{CAL}$, the extra energy achieves maximum value. The area 1003 in lattice represents the energy saving from changing the switching interval from $T_{CAL}$ to $T_{INT}$. For each assuming switching interval, the energy saving value is calculated.

At the same time, the extra cost from changing the switching interval from $T_{CAL}$ to $T_{INT}$ is calculated. The extra cost includes at least two parts, one is the energy waste during the switching, the other is the increased depreciation cost of the device. As the switching interval become smaller, the switching times increases, thus the energy waste during the switching and the depreciation cost of the devices also increases. For each assuming switching interval, the saving cost and the extra cost are calculated. The calculated values can form the two different curves. The saving cost 1101 and the extra cost 1102 are illustrated in FIG. 11. The optimum value of the switching interval is selected that can get maximum cost saving. The calculation accuracy is determined by the switching interval calculation number.

Updating the traffic calculation period $T_{CAL}$ is based on the traffic history data. This parameter is used to reflect the periodic character of the traffic history, which can be selected as the value with the minimum standard deviation of the traffic history data.

Updating the investigation parameter k is based on the difference of the traffic data recorded during the last switching interval and the traffic history data in the same period of time in the traffic calculation period. If the difference is large, the parameter k is reduced, and vice versa.

Fourth Embodiment

The architecture of the fourth embodiment is illustrated in FIG. 12. In this embodiment, the BBUs are realized as the virtual form. In the general purpose central processing unit (CPU) based server 1200, the BBUs are implemented through virtualization technology as the virtual BBU (vBBU) 1203. The CU 1201 and THSU 1202 are also implemented by virtualization.

For BBU state switching, the CU 1201 controls the server 1200 to enable or disable the computation resource assignment of the corresponding virtual BBUs. According to the traffic, only the necessary computation resources are assigned for the processing.

The working process in the second exemplary embodiment is illustrated in FIG. 13.

At first, it is judged whether or not it is an initialization process (S1301). For an initialization process, the external setting and control unit initializes the period of time $T_{CAL}$ during which the cost calculation is carried out (S1302). The traffic history parameter k is initialized which is used to indicate the length of the traffic history (S1303). The traffic history data during the period of time $kT_{CAL}$ is also initialized (S1304). Based on the traffic history data during the period of time $kT_{CAL}$, the optimum value $T_{INT}$ with the maximum cost reduction is calculated as the following equation (S1305).

$$T_{INT} = \sqrt{\frac{2T_{CAL}E_{SW}}{\lambda}} \qquad \text{[Math. 1]}$$

In this equation, the $E_{SW}$ is the energy cost for each switching, which is the constant set by the external setting and control. Lambda is calculated from the history data during the period of time $kT_{CAL}$.

The example the calculation of Lambda is illustrated in FIG. 14. In this figure, the curve is according to the average traffic data of the $kT_{CAL}$ period of time. The point A to I have the same time interval for the $T_{CAL}$. Lambda is calculated by the following equation.

$$\lambda = |P_A - P_B| + |P_B - P_C| + \ldots + |P_H - P_H| \qquad \text{[Math. 2]}$$

The calculation accuracy is determined by the number of points which are selected to calculate the Lambda.

After determining the $T_{INT}$ and the following switching operation, during the interval time $T_{INT}$, the traffic is recorded for next switching interval determination (S1306).

For the process with no initialization, the period of time $T_{CAL}$ during which the cost calculation is carried out is updated based on the traffic history update (S1307). The traffic history parameter k is updated based on the difference of the traffic history data recorded during the last switching interval and the traffic history data in the same period of time (S1308).

The traffic history data during the updated period of time $kT_{CAL}$ is fetched from THSU 1202 (S1309).

Based on the traffic history data during the period of time $kT_{CAL}$, the optimum value $T_{INT}$ with the maximum cost reduction is calculated in the same way (S1310). After the following switching operation, during the interval time $T_{INT}$, the traffic is recorded for next switching interval determination (S1311).

Other Embodiments

The information processing procedure corresponding to the client or customer need not always be owned by only the client who has created it, and may be made open to other clients under predetermined conditions. In this case as well, access to the result of information processing is preferably permitted for only authenticated clients.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when a control program for implementing the functions of the embodiments is supplied to the system or apparatus directly or from a remote site. Hence, the present invention also incorporates the control program installed in a computer to implement the functions of the present invention on the computer, a medium storing the control program, and a WWW (World Wide Web) server that causes a user to download the control program.

What is claimed is:

1. An information processing apparatus for adjusting a switching interval which defines an interval between two switching operations that change the activation state of base band units, comprising:
    a traffic history storage that stores traffic history data; and
    a controller that calculates saved costs for different switching intervals based on traffic history data during a selected period of time and determines the switching interval based on the traffic history data stored in the traffic history storage.

2. The apparatus according to claim 1, wherein the controller further calculates extra costs for different switching intervals based on the traffic history data during the selected period of time.

3. The apparatus according to claim 2, wherein the controller determines the switching interval which maximizes a difference between one of the saved costs and one of the extra costs.

4. An information processing method of adjusting a switching interval which defines an interval between two switching operations that change the activation state of base band units, comprising:
    calculating saved costs for different switching intervals based on traffic history data stored in a traffic history storage during a selected period of time, and
    determining a switching interval among the different switching intervals by using the calculated saved costs.

5. The method according to claim 4, further comprising:
    calculating extra costs for each of the different switching intervals based on the traffic history data,
    wherein the switching interval is selected among the different switching intervals based on a difference between the calculated saved cost and the calculated extra cost.

6. The method according to claim 5, wherein the switching interval, which maximizes a difference between one of the saved costs and one of the extra costs, is determined.

7. A non-transitory computer readable medium storing a control program of an apparatus that adjusts a switching interval which defines an interval between two switching operations that change the activation state of base band units, which causes a computer to execute:
    calculating saved costs for different switching intervals based on traffic history data stored in a traffic history storage during a selected period of time, and
    determining a switching interval among the different switching intervals by using the calculated saved costs.

* * * * *